US008689584B2

(12) United States Patent
Sudo et al.

(10) Patent No.: US 8,689,584 B2
(45) Date of Patent: Apr. 8, 2014

(54) METHOD OF MANUFACTURING VITREOUS SILICA CRUCIBLE

(75) Inventors: Toshiaki Sudo, Akita (JP); Eriko Suzuki, Akita (JP)

(73) Assignee: Japan Super Quartz Corporation, Akita (JP)

(*) Notice: Subject to any disclaimer, the term of this patent is extended or adjusted under 35 U.S.C. 154(b) by 210 days.

(21) Appl. No.: 13/337,888

(22) Filed: Dec. 27, 2011

(65) Prior Publication Data
US 2012/0167625 A1 Jul. 5, 2012

(30) Foreign Application Priority Data

Dec. 31, 2010 (JP) ................................. 2010-294632

(51) Int. Cl.
C03B 19/09 (2006.01)

(52) U.S. Cl.
USPC .............................................. 65/17.4; 65/17.3

(58) Field of Classification Search
None
See application file for complete search history.

(56) References Cited

U.S. PATENT DOCUMENTS

| 4,043,780 | A | * | 8/1977 | Bricker et al. | ............... | 65/29.19 |
| 4,144,758 | A | * | 3/1979 | Roney | ............................. | 374/126 |
| 5,174,801 | A | | 12/1992 | Matsumura et al. | | |
| 2010/0244311 | A1* | | 9/2010 | Kishi et al. | ..................... | 264/219 |
| 2011/0295405 | A1* | | 12/2011 | Sudo et al. | .................... | 700/104 |

FOREIGN PATENT DOCUMENTS

| EP | 2226300 A1 | 9/2010 |
| JP | 08-169798 A | 7/1996 |
| JP | 2933404 B | 8/1999 |
| JP | 2001-089171 A | 4/2001 |
| JP | 2002-154890 A | 5/2002 |
| JP | 2002-154894 A | 5/2002 |
| JP | 2002154890 A * | 5/2002 |
| WO | WO 2011074588 A1 * | 6/2011 |

OTHER PUBLICATIONS

Translation of JP2002-154890, translated by the McElroy Translation Co., Oct. 2013.*
Extended European Search Report mailed Sep. 24, 2012, issued in corresponding Application No. EP 11196037.3.
"Les Pyrometres Infrarouge Sans Contact", Mesures Regulation Automatisme, CFE. Paris, FR, No. 706, Jun. 1, 1998, pp. 88-94, XP000869136, ISSN: 0755-219X.
A Notification of First Office Action with Search Report issued by the State Intellectual Property Office of China, mailed Nov. 19, 2013, for Chinese counterpart application 2011104447203.

* cited by examiner

Primary Examiner — Matthew Daniels
Assistant Examiner — Lisa Herring
(74) Attorney, Agent, or Firm — Law Office of Katsuhiro Arai

(57) ABSTRACT

The present invention provides a method of manufacturing a vitreous silica crucible including: a silica powder supplying process of supplying a material silica powder into a mold for molding a vitreous silica crucible, to form a silica powder layer, and an arc fusing process of arc fusing the silica powder layer by arc discharge generated by carbon electrodes, wherein the arc fusing process includes processes of measuring temperatures at measuring points provided on different heights of an inner surface of the silica powder layer while rotating the mold, and controlling the arc discharge to enable detection, at each measuring point, of a local maximum point which appears first in the arc fusing process.

4 Claims, 8 Drawing Sheets

METHOD OF MANUFACTURING VITREOUS SILICA CRUCIBLE

CROSS-REFERENCE TO RELATED APPLICATION

This application is related to Japanese Patent Application No. 2010-294632 filed on Dec. 31, 2010, whose priority is claimed and the disclosure of which is incorporated by reference in its entirety.

BACKGROUND OF THE INVENTION

1. Field of the Invention

The present invention relates to a method of manufacturing a vitreous silica crucible.

2. Description of the Related Art

A silicon single crystal has been manufactured by the Czochralski method (the CZ method) using a vitreous silica crucible. In this method, polycrystalline silicon raw material is melted and retained in the vitreous silica crucible, a seed crystal of silicon single crystal is dipped into the silicon melt, and the seed crystal is gradually pulled while rotating it, to produce a silicon single crystal by use of the seed crystal as a core.

The vitreous silica crucible used in this method has two-layer structure including an outer layer containing a number of bubbles and a transparent inner layer. The vitreous silica crucible is usually manufactured by a method of arc fusing a silica powder layer while rotating the mold (See JP-A-2001-89171).

It is known that the property of the crucible inner surface which contacts silicon melt while pulling a single crystal influences the property of the obtained silicon single crystal, and thus influences the yield of silicon wafers which are the final products.

Thus, the vitreous silica crucible may have an inner layer made of synthetic vitreous silica and an outer layer made of natural vitreous silica, in order to minimize the ununiformity of the property of silicon single crystals.

By the way, when silicon is melted in a vitreous silica crucible and a single crystal is pulled therefrom, melt surface vibration occurs and thus seeding of a seed crystal becomes difficult. In this case, the melt surface vibration prevents pulling of a silicon single crystal or prevents single crystallization. The problem of the melt surface vibration becomes more eminent as the diameter of the silicon crystal increases. Thus, it has been further demanded to improve the inner surface property of the vitreous silica crucible.

In order to satisfy the demand, JP-A-2002-154894 proposed to use a crucible whose weight reduction after exposure to $SiO_2$ vapor is 0.013 g or less. However, the improvement of the crucible inner surface property was not sufficient.

Furthermore, in order to obtain a wafer having a diameter of 300 mm or more, i.e. approx. 450 mm, it has been demanded to increase the diameter of a silicon single crystal. This demand elongates the time for pulling a single crystal, and thus elongates the time during which the crucible inner surface contacts silicon melt of 1400 deg. C. or more. This causes the following problem.

When the time for pulling is elongated, the contact time of the crucible inner surface with silicon melt is also elongated. In this case, the crucible inner surface reacts with silicon melt, to cause crystallization in the surface or a shallow layer from the surface of the crucible inner surface. The reaction causes ring-shaped brown cristobalite (hereinafter, the ring-shaped cristobalite is referred to as "brown ring"). A cristobalite layer is not formed in the inside of the brown ring, or if any, the cristobalite layer is a thin layer. The brown ring increases the area as the increase of the operation time, and the adjacent brown rings merge and grow. Finally, the center of the brown ring is corroded to expose irregular vitreous silica corroded surface.

When tiny pieces of vitreous silica detaches from the vitreous silica corroded surface, dislocation is more likely to occur in the silicon single crystal, and thus deteriorates the single crystallization yield. In particular, in order to grow a silicon single crystal for manufacturing a wafer having a diameter of 300 mm, it is necessary to continue the operation of the CZ method for 100 hours or more, and thus the vitreous silica corroded surface is more likely to appear.

It is considered that the aforementioned brown ring is generated from a core which is a tiny scratch on the vitreous silica surface, a crystalline residual portion which is an unfused portion of material silica powder, or a defect of vitreous silica structure. It is considered that the number of the brown rings can be reduced by maintaining a good surface state of vitreous silica, or reducing the crystalline residual portion by fusing silica powder at higher temperature and for a longer time in the vitreous silica crucible manufacturing process. Furthermore, as described in JP-B-2811290 and JP-B-2933404, amorphous synthetic silica powder can be used as material silica powder for forming the inner surface.

Synthetic vitreous silica made of amorphous synthetic silica powder contains impurities in an extremely small amount, and thus the use of synthetic silica powder can reduce the number of brown rings. However, the crucible having an inner layer of synthetic vitreous silica has a drawback in that melt surface vibration is more likely to occur when polysilicon is melted in the crucible having an inner layer of synthetic vitreous silica than a crucible having an inner layer made of natural vitreous silica. The vibration is in particular observed from a seeding process to a shoulder formation process, and at initial stage of pulling a first half of the body of a single crystal. Therefore, the melt surface vibration necessitated longer time for seeding, disturbed crystallization, and necessitated meltback, which led to drop in the productivity.

SUMMARY OF THE INVENTION

It is considered that in order to alleviate the melt surface vibration and generation of brown rings during silicon melting, the temperature of the fused portion can be controlled to form an inner layer.

However, in manufacturing a vitreous silica crucible, the temperature of the fused portion can be over 2000 deg. C. There is no established technique to precisely measure such high temperature. Furthermore, there is no technique to enable temperature measurement of a target object in a stringent condition in which the target object is heated and fused near arc flame. Furthermore, the temperature control of vitreous silica is difficult because, unlike other material, the glass transition of vitreous silica does not appear clearly.

Thus, it is difficult to determine and control the fusing temperature in manufacturing a vitreous silica crucible.

The present invention has been made in view of these circumstances, and provides a method of manufacturing a vitreous silica crucible, which enables manufacturing a crucible which can suppress generation of brown rings on the crucible inner surface during manufacturing a silicon single crystal, and thus suppress the melt surface vibration, by controlling the fused state during manufacturing the vitreous silica crucible.

The present invention provides a method of manufacturing a vitreous silica crucible comprising: a silica powder supplying process of supplying a material silica powder into a mold for molding a vitreous silica crucible, to form a silica powder layer, and an arc fusing process of arc fusing the silica powder layer by arc discharge generated by carbon electrodes, wherein the arc fusing process includes processes of measuring temperatures at measuring points provided on different heights of an inner surface of the silica powder layer while rotating the mold, and controlling the arc discharge to enable detection, at each measuring point, of a local maximum point which appears first in the arc fusing process.

The local maximum point is considered to be related to fusing of silica powder. Therefore, it is possible to accurately detect the fused state of the silica powder layer by detecting the local maximum points at plural measuring points provided on different height positions, and thus it is possible to improve the inner surface property of the vitreous silica crucible by accurately controlling the arc discharge. Therefore, it is possible to manufacture a vitreous silica crucible which can prevent generation of brown rings on the crucible inner surface and thus prevent melt surface vibration during manufacturing a silicon single crystal.

Here, the crucible properties mean factors which can influence properties of semiconductor single crystal pulled by use of the vitreous silica crucible. Such properties includes a vitrification state on a crucible inner surface, a bubble distribution and bubble size along a thickness direction, OH group content, impurities distribution, surface irregularity, and ununiformity of these factors along the crucible height direction.

A vitreous silica crucible is the only and important component which contacts silicon melt, and determines the yield and quality of a silicon single crystal. Depending on the bubble distribution and bubble size along the thickness direction, the bubbles rupture and vitreous silica pieces mix in silicon melt during pulling a silicon single crystal. When the vitreous silica pieces attach to a silicon single crystal ingot, the ingot can be polycrystallized. The vitreous silica crucible is easily crystallized to generate cristobalite depending on the OH group content, and the cristobalite detached from the vitreous silica crucible attaches an end of silicon single crystal to polycrystallize it. Furthermore, there's also possibility of lowering of viscosity of vitreous silica.

When impurities exist in the vitreous silica crucible, the impurities promote generation of spotty cristobalite on the inner surface of the vitreous silica crucible during pulling a single crystal. Thus-formed cristobalite detaches from the crucible, drops in silicon melt, and deteriorates the single crystallization yield of the pulled single crystals.

In the arc fusing process, the fusing conditions of the silica powder layer are adjusted so that the local maximum point is detected at each measuring point within the predetermined fusing time. In this case, the fusing conditions of the silica powder layer can be adjusted very precisely, and thus the inner surface property of the vitreous silica crucible can be more improved.

Furthermore, in the arc fusing process, the temperature of the silica powder layer can be measured by detecting radiation energy of a wavelength of 4.8 to 5.2 μm by a radiation thermometer. In this case, the temperature near the surface of the silica powder layer which is fused in a stringent environment over 2000 deg. C. can be measured precisely in real time. Thus, it is possible to precisely and easily detect the local maximum point of the temperature.

Furthermore, in the arc fusing process, the radiation thermometer and the measuring point may be provided so that a line connecting the radiation thermometer and the measuring point is separated by 100 mm or more from a rotation axis of the mold. In this case, the temperature measurement is not largely affected by the carbon electrodes and the arc discharge, and the accuracy of the temperature measurement is improved.

Furthermore, in the arc fusing process, the radiation thermometer may change the measuring target among the plural measuring points to follow the movement of the carbon electrodes. In this case, it is possible to detect the local maximum points at plural measuring points by use of a single radiation thermometer.

Furthermore, in the arc fusing process, the number of the radiation thermometers is plural, and the radiation thermometers measure temperatures at plural measuring points provided on different heights. In this case, it is possible to detect the local maximum points at plural measuring points.

DESCRIPTION OF THE PREFERRED EMBODIMENTS

Hereinafter, an embodiment of a method of manufacturing a vitreous silica crucible, according to the present invention will be explained with reference to drawings.

Figure 1:
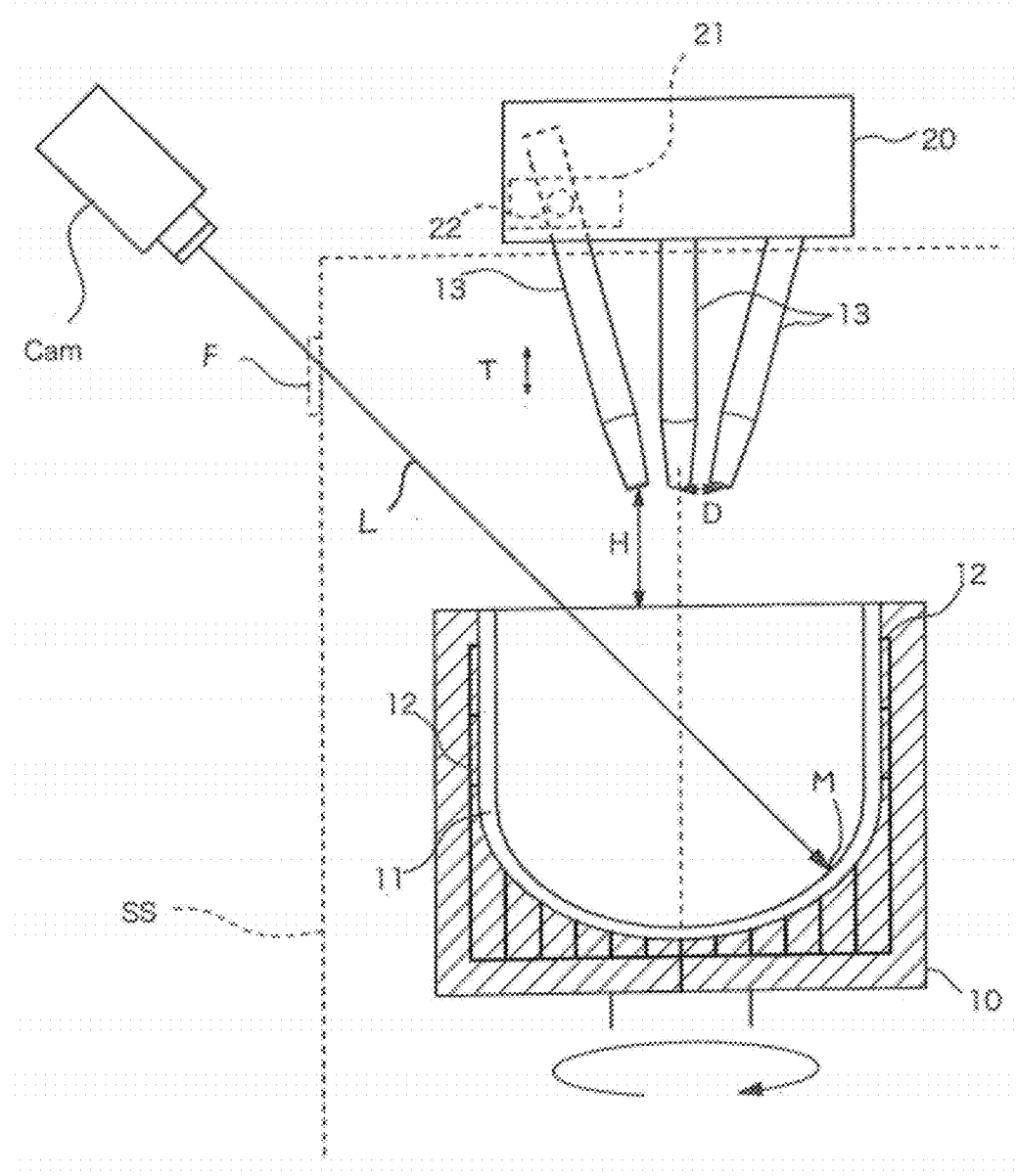
FIG. 1 is a schematic front view showing a manufacturing apparatus used in an embodiment of a method of manufacturing a vitreous silica crucible, according to the present invention.

FIG. 1 is a schematic front view showing an apparatus for manufacturing a vitreous silica crucible, according to the present invention.

The apparatus 1 for manufacturing a vitreous silica crucible of the present embodiment includes a mold 10 which is rotatable by a rotation unit (not shown) and defines an outer shape of a vitreous silica crucible.

Silica powder is supplied and deposited, by a silica powder supplying unit, on the inner surface of the mold 10 to form a silica powder layer 11 with a predetermined thickness.

The mold 10 includes ventilation passages 12 which are open to the inside of the mold 10. The ventilation passages 12 are connected to a pressure-reducing unit (not shown).

Carbon electrodes 13 connected to a power-supply unit (not shown) are provided above the mold as an arc discharge unit. The silica powder layer 11 in the mold 10 is heated and fused by arc discharge between carbon electrodes 13 with an output range of 300 kVA to 12,000 kVA.

The carbon electrodes 13 are vertically movable as shown by the arrow T by an electrode position setting unit 20 so that the height position H is adjustable. Furthermore, the opening angle of the carbon electrodes 13 and the interelectrode distance D shown by the arrow D are adjustable by the electrode position setting unit 20. Furthermore, the other relative position of the carbon electrodes 13 to the mold 10 is also adjustable by the electrode position setting unit 20.

As shown in FIG. 1, the electrode position setting unit 20 includes a supporting unit 21, a horizontal movement unit, and a vertical movement unit. The supporting unit 21 supports the carbon electrode 13 so that the interelectrode distance D is adjustable. The horizontal movement unit enables horizontal movement of the supporting unit 21. The vertical movement unit enables vertical movement of the supporting units 21 and the horizontal movement units together.

In the supporting unit 21, the carbon electrode 13 is rotatably supported at an angle setting axis 22, and there is provided a rotation unit to control a rotation angle of the angle setting axis 22.

The interelectrode distance D between the carbon electrodes 13 can be adjusted by changing the angle of the carbon electrodes 13 and the horizontal position of the supporting unit 21 by the horizontal movement unit. Furthermore, the height position of the electrode tip 13a with respect to the upper end position of the silica powder layer 11 (i.e. the upper end position of the opening of the mold 10) can be adjusted by changing the height position of the supporting unit 21 by the vertical movement unit.

In FIG. 1, only the carbon electrode 13 at the left end is supported by the supporting unit 21 and so on. However, other carbon electrodes are also supported by the same structure. A height of each carbon electrodes 13 is separately controllable.

Figure 2A:
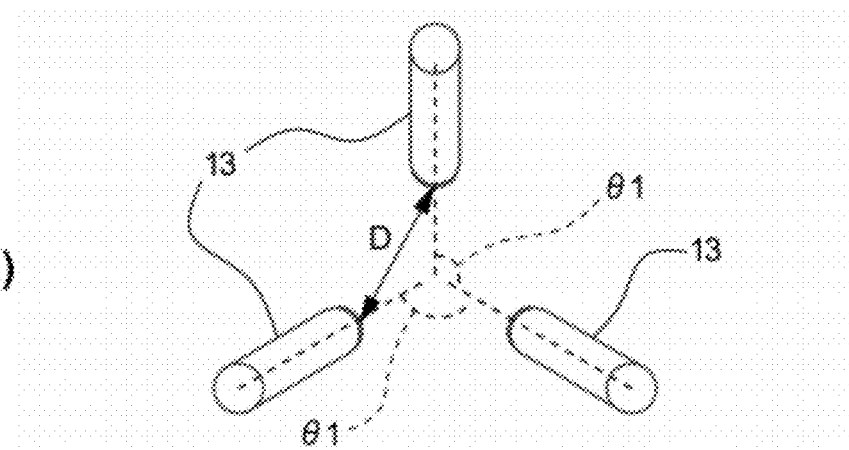
FIGS. 2(a) and 2(b) are a schematic plan view and a schematic side view, respectively, showing a position of carbon electrodes of FIG. 1
Figure 2B:
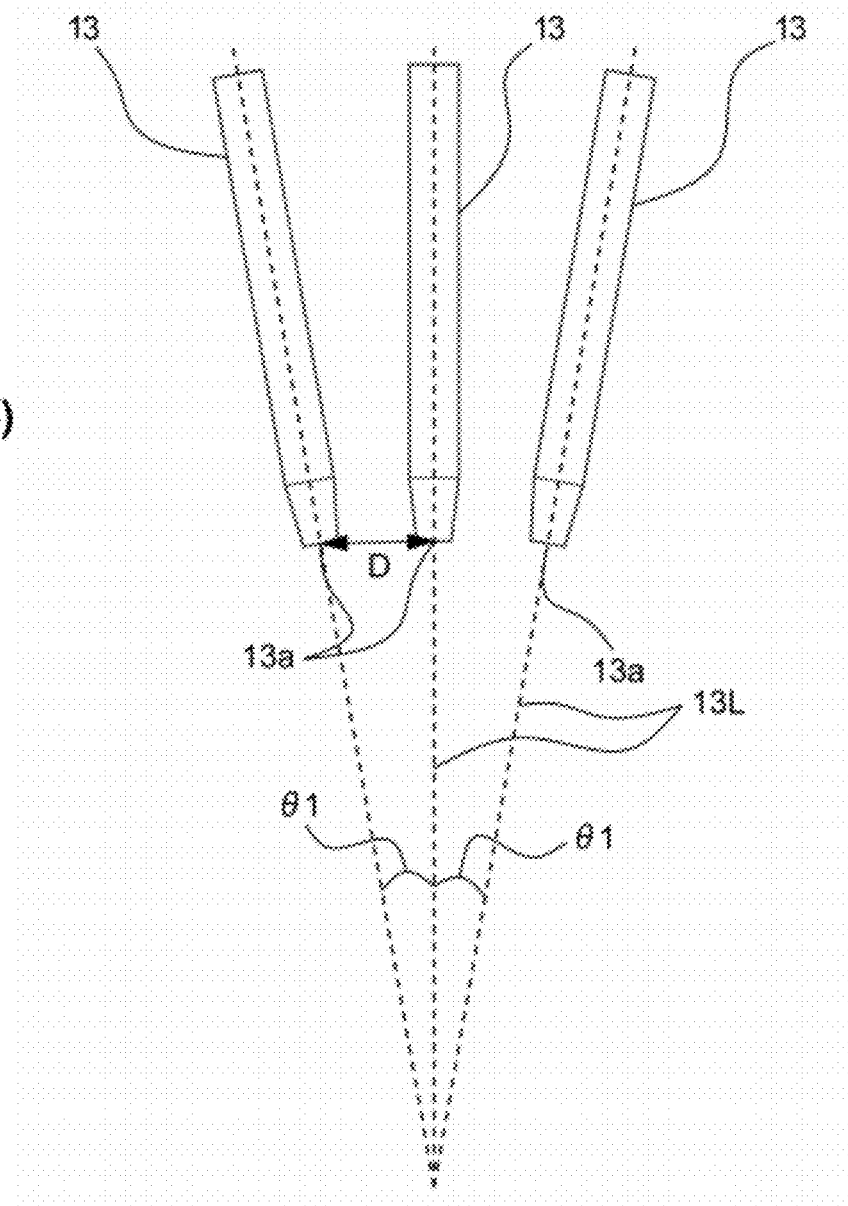

FIGS. 2(a) and 2(b) are a schematic plan view and a schematic side view, respectively, showing a position of carbon electrodes of FIG. 1.

The carbon electrodes 13 are of the same shape so that they are used to generate arc discharge in alternate current three phase (R phase, S phase, T phase). As shown in FIGS. 1 and 2, they are provided to form an inverse three-sided pyramid having a downwardly-directed tip. In addition, they are provided so that angles between axes 13L of the electrodes 13 are θ1.

The carbon electrodes 13 may be made of highly-pure carbon particles with a particle diameter of 0.3 mm or less, preferably 0.1 mm or less, more preferably 0.05 mm or less. When the density is 1.30 g/cm$^3$ to 1.80 g/cm$^3$, the difference in density between the carbon electrodes 13 is preferred to be 0.2 g/cm$^3$ or less.

Furthermore, the apparatus 1 includes a temperature measurement unit for measuring the temperature of the silica powder layer 11 to be fused in the mold 10, and a controller for controlling the amount of current supplied to the carbon electrodes 13 based on the temperature measured by the temperature measurement unit and inputted into the controller.

The temperature measurement unit of the present embodiment is a radiation thermometer Cam for measuring the temperature at the fused portion in the mold 10.

The radiation thermometer Cam includes an optical system for condensing radiation energy light from the fused portion of the surface of the silica powder layer 11, a spectroscopic unit for obtaining a spectrum for the condensed light, and a detection element for detecting light related to the measuring object from the spectrum.

The radiation thermometer Cam is provided on the outer side of the partition wall SS. The partition wall SS separates, from the outer side, the inner side where the arc discharge is carried out. The radiation thermometer Cam measures the fused portion through a filter F covering a window provided on the partition wall SS.

The analog output signal of the detection element of the radiation thermometer Cam is divided by the wavelength by a synchronous detector, amplified by an amplifier. Thereafter, the signal is transmitted to a controller (CPU) via a multichannel, low resolution, and small bit AD converter. The signal is subjected to arithmetic processing in the CPU to produce a desired temperature signal. Thereafter, the temperature signal is outputted to the controller of the vitreous silica crucible manufacturing apparatus. Furthermore, the temperature signal can be outputted to a display unit such as a LCD display.

The range of the measuring temperature of the radiation thermometer Cam is preferred to be 400 to 2800 deg. C.

In this case, the temperature of the material silica powder and the temperature of the fused state of the silica powder can be measured continuously in a broad range of 400 to 2800 deg. C. Therefore, it is possible to measure the temperature from the beginning to the end of the fusing, and to the end of the cooling.

The temperature lower than 400 deg. C. is not very much related to the crucible property, and thus it is not meaningful to measure such temperature. The temperature higher than 2800 deg. C. requires a special apparatus for measurement, and thus it is costly to measure such temperature, and in addition, such temperature is above the temperature of normal manufacturing. The range of the measuring temperature may be in the range of any two values of 400, 700, 1000, 1500, 2000, 2500, and 2800 deg. C.

Furthermore, in the radiation thermometer Cam of the present embodiment, it is preferred to detect the radiation energy of a wavelength of 4.8 to 5.2 μm to measure the temperature. The wavelength may be 4.8, 4.9, 5.0, 5.1, or 5.2 μm, or it can be in the range between two values of the values exemplified here. The measurement diameter of the radiation thermometer Cam is not in particular limited, but may be 100, 50, 40, or 30 mm or less. When the measurement diameter is small, it is easier to measure the accurate temperature of the fused portion, and thus smaller measurement diameter is better, and the diameter of 30 mm or less is in particular preferable.

When the measurement wavelength is within the aforementioned range, the absorption by $CO_2$ which can be generated from the carbon electrodes 13 during the arc discharge does not disturb the temperature measurement because the absorption band of $CO_2$ is in a wavelength of 4.2 to 4.6 μm. Furthermore, $H_2O$ contained in the air which is an ambient atmosphere during manufacturing a vitreous silica crucible has an absorption band of 5.2 to 7.8 μm, and thus the absorption by $H_2O$ does not disturb the temperature measurement.

Furthermore, the transmittance of vitreous silica is 0 for a wavelength of 4.8 μm or more, and thus the surface of vitreous silica, which is a measuring object, can be easily measured.

The radiation thermometer Cam is preferred to have a filter F which allows radiation energy of a wavelength of 4.8 to 5.2 μm to transmit. Such filter is preferred to be made of $BaF_2$ or $CaF_2$. The transmittance of such filter F is high for light having a specific range of wavelength which is radiated from the crucible inner surface, which is a measuring object. Therefore, by use of the filter F, the intensity of the light used for the temperature measurement is not weakened. When the filter F made of $BaF_2$ or $CaF_2$ is used, it is preferred not to use a wavelength of 8 to 14 μm for measurement because the transmittance of $BaF_2$ or $CaF_2$ is low for such wavelength. Therefore, it is possible to prevent the drop of the transmittance and enhance the accuracy of temperature measurement by not using such wavelength.

By the way, the transmittance of commonly manufactured silicate glass is high for infrared light having a wavelength of approx. 2.5 μm or less, but becomes much lower for light having a longer wavelength because of the absorption by vibration of Si—O bond. The transmittance of glass not containing Si—O bond is higher for infrared light than silicate glass, but such glass is poor at the stability and chemical durability, and thus not practical.

Fluoride glass has high transmittance for light of a broad wavelength from ultraviolet to infrared, and has high stability and chemical durability. Therefore, the use of the filter F made of $BaF_2$ or $CaF_2$ enables accurate measurement.

The observation line L connecting the radiation thermometer Cam and the measuring point M is preferred to be separated by 100 mm or more from the carbon electrodes 13. In this case, the arc flame and electrode radiation generated near the carbon electrodes 13 do not seriously disturb the accuracy of the temperature measurement.

When the distance from the observation line L to the carbon electrodes 13 is larger than the crucible radium, the distance is too large for accurate temperature measurement of a specific measuring point M. In addition, the amount of radiation from the measuring point M to the radiation thermometer Cam becomes insufficient, and thus the temperature measurement becomes inaccurate. The crucible diameter is, for example, 22 inches (55.88 cm), 28 inches (71.12 cm), 32 inches (81.28 cm) or 40 inches (101.6 cm), and it can be in the range between two values of the values exemplified here.

Figure 3:
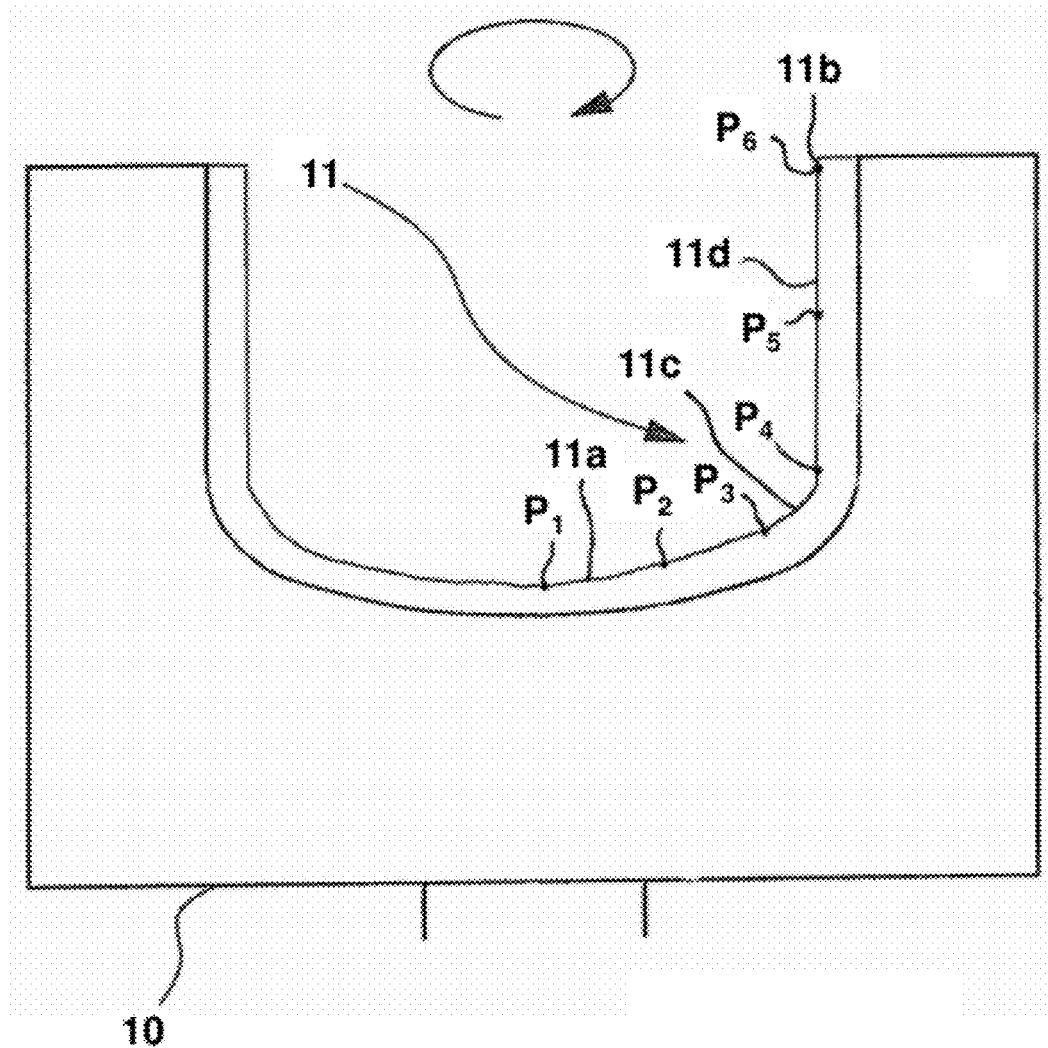
FIG. 3 is a sectional view showing a mold of an embodiment of an apparatus for manufacturing a vitreous silica crucible, according to the present invention.

In the present embodiment, the temperature of the inner surface of the vitreous silica crucible 10 is measured at six points from the measuring point $P_1$ at the bottom portion 11a to the measuring point $P_6$ at the upper end portion 11b as shown in FIG. 3 by use of a single radiation thermometer Cam. The measuring point $P_3$ is a measuring point at the center of the corner portion 11c. The measuring point $P_2$ is a measuring point at the midpoint between the measuring points $P_1$ and $P_3$. The measuring point $P_4$ is a measuring point at the upper side of the corner portion 11c. The measuring point $P_5$ is a measuring point at the wall portion 11d.

In measuring the temperature at any of the measuring points $P_1$ to $P_6$, the radiation thermometer Cam and the measuring points $P_1$ to $P_6$ are provided so that a line connecting the radiation thermometer Cam and each of the measuring points $P_1$ to $P_6$ is separated by 100 mm or more from the rotation axis of the mold (in other words, not on the rotation axis of the mold). In this case, the temperature measurement is not largely affected by the carbon electrodes and the arc discharge, and the accuracy of the temperature measurement is improved.

Here, the corner portion 11c is a curved portion smoothly connecting the cylindrical wall portion 11d and the bottom portion 11a having a constant curvature.

The angle of the radiation thermometer Cam with respect to the horizontal direction may be changed to measure the temperatures at the measuring points $P_1$ to $P_6$ by use of the single radiation thermometer Cam. The angle of the radiation thermometer Cam is preferred to be changed automatically. That is, the radiation thermometer Cam may change the measuring target among the plural measuring points $P_1$ to $P_6$ to follow the movement of the carbon electrodes. Which band region of the inner surface of the vitreous silica crucible 10 reaches the local maximum point depends on the movement of the carbon electrodes. However, because the radiation thermometer Cam changes the measuring target among the plural measuring points $P_1$ to $P_6$ to follow the movement of the carbon electrodes, the temperature state of a band region, which is about to reach the local maximum point, of the inner surface of the vitreous silica crucible 10 can be accurately measured, and thus the local maximum point of temperature can be accurately and easily detected at plural measuring bands.

Alternatively, the number of the radiation thermometers Cam is plural, and the radiation thermometers measures temperatures at plural measuring points $P_1$ to $P_6$ provided on different heights. In this case, the local maximum point of temperature can be accurately and easily detected at plural measuring bands.

Figure 4:
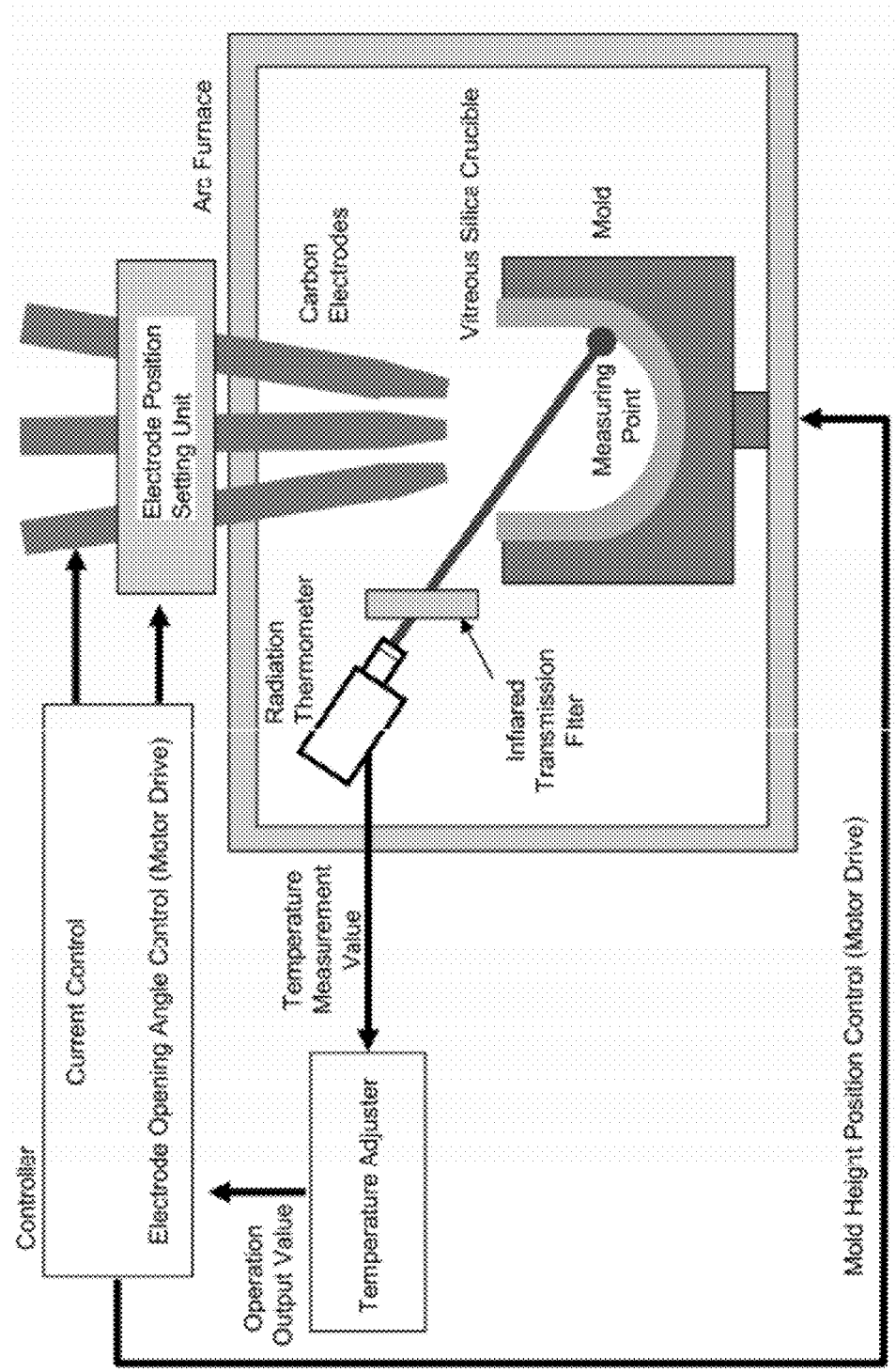
FIG. 4 is a conceptual diagram showing a method of feedback control of crucible temperature.

FIG. 4 is a conceptual diagram showing a method of feedback control of crucible temperature, in the method of manufacturing a vitreous silica crucible, according to the present embodiment. The method of feedback control is carried out by the apparatus having carbon electrodes, a radiation thermometer, an infrared transmission filter, a temperature adjuster, and a controller, and an electrode position setting unit.

The method of feedback control includes processes of: generating arc discharge by the carbon electrodes to heat and fuse the nonconductive object (silica powder) in the mold, and detecting, through an infrared transmission filter, radiation energy having a wavelength of 4.8 to 5.2 μm which is radiated from the heated and fused portion (a measuring point). In the radiation thermometer, the radiation energy is condensed by an optical lens or the like, and the condensed energy is converted to a temperature measurement value which is proportional to the amount of the radiation energy, and the value is outputted to a temperature adjuster as voltage or current. The temperature adjuster compares the temperature measurement value with the optimal fusing temperature, converts it into an appropriate operation output value, and outputs the value to a controller. The controller controls the current value, the opening angle of the electrodes, and the height of the mold, based on the operation output value. In this way, the current supplied to the carbon electrodes, the position of the carbon electrodes, the relative position of the mold and the carbon electrodes, and the position of the mold can be changed.

The optimal fusing temperature in the present specification can be determined empirically, or by a computational method such as simulation. For example, the time-course temperature data of the inner surface of the silica powder layer during heating and fusing the silica powder layer for manufacturing a crucible is acquired by use of the radiation thermometer for many crucibles. Then, by use of each of these crucibles, a silicon single crystal is pulled at 1400 deg. C. or more by the CZ method. Then, from the time-course temperature data for the crucible which has enabled stable manufacturing of a high-quality silicon single crystal by the CZ method, the time-course optimal temperature of the inner surface of the silica powder layer during heating and fusing the silica powder layer can be determined empirically, or by a computational method.

Next, a method of manufacturing a vitreous silica crucible, according to one embodiment of the present invention will be explained.

Figure 5:
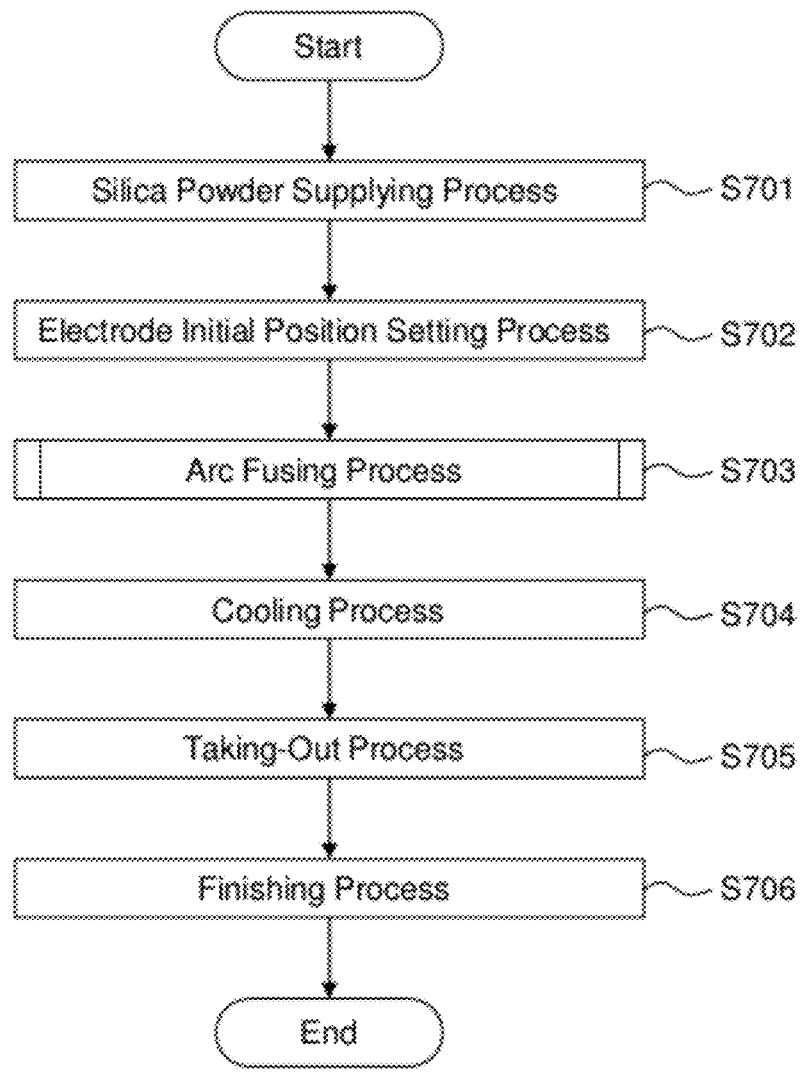
FIG. 5 is a flowchart showing an embodiment of a method of manufacturing a vitreous silica crucible, according to the present invention.
Figure 6:
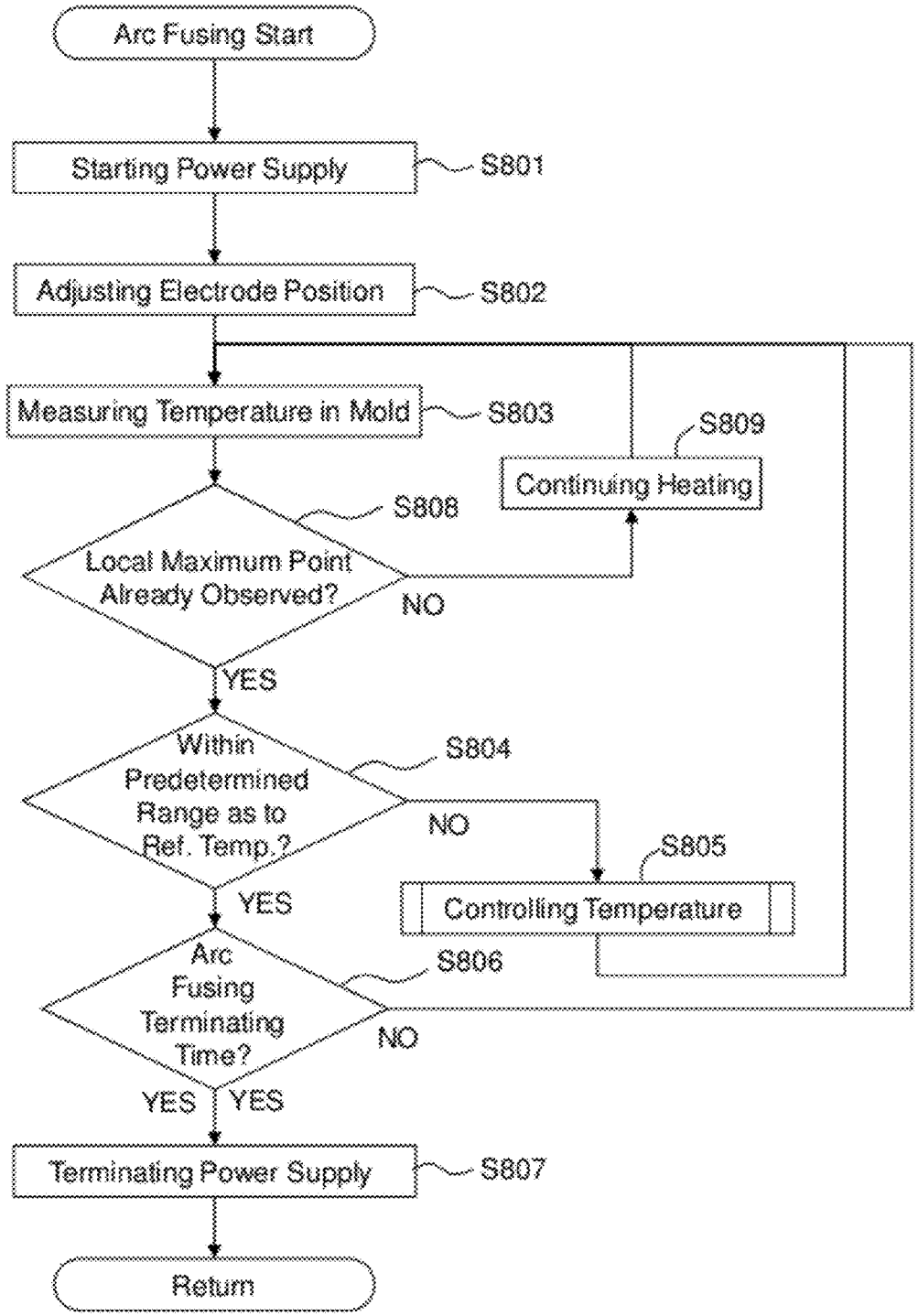
FIG. 6 is a flowchart showing an arc fusing process in the embodiment of a method of manufacturing a vitreous silica crucible, according to the present invention.
Figure 7:
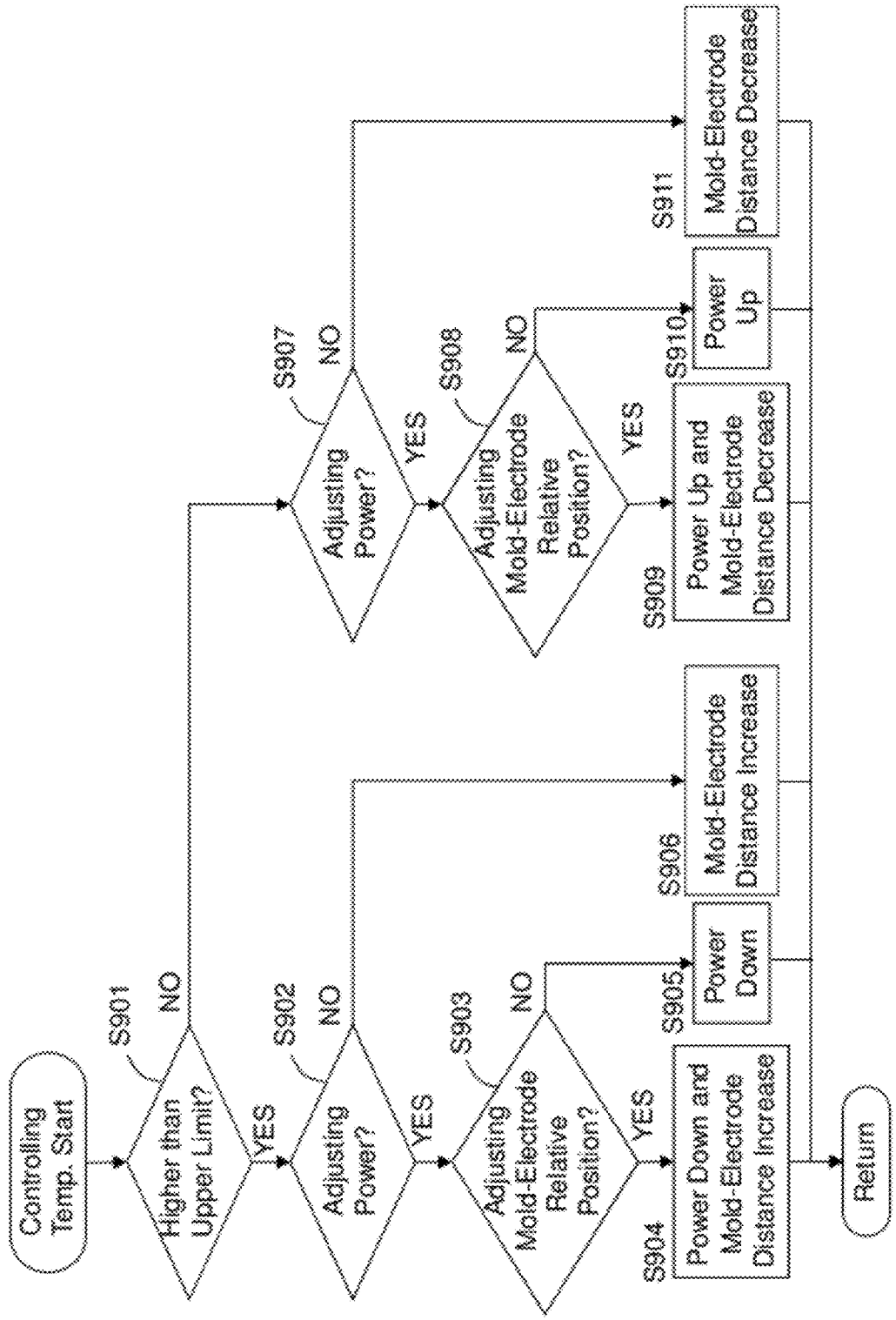
FIG. 7 is a flowchart showing a temperature controlling process in the embodiment of a method of manufacturing a vitreous silica crucible, according to the present invention.

The method of manufacturing a vitreous silica crucible of the present embodiment includes, as shown in flowcharts in FIGS. 5 to 7, a silica powder supplying process (S701), electrode initial position setting process (S702), an arc fusing process (S703), an cooling process (S704), an taking-out process (S705), and a finishing process (S706).

In the silica powder supplying process (S701), silica powder is deposited on the inner surface of the mold 10 to form a silica powder layer 11. The silica powder layer 11 is retained on the inner surface of the mold by the centrifugal force generated by the rotation of the mold 10.

As the silica powder, it is preferred that synthetic silica powder is used for the inner layer, and natural silica powder is used for the outer layer.

Here, synthetic silica powder means powder made of synthetic silica, and is a chemically synthesized and manufactured material. Synthetic silica powder is amorphous.

Because raw material of synthetic silica is gas or liquid, it can be easily purified, and thus synthetic silica powder can be more highly-pure than natural silica powder. Raw material of synthetic silica may be gaseous raw material such as silicon tetrachloride, or may be liquid raw material such as silicon alkoxide. In synthetic silica powder, the amount of any metal impurity can be made 0.1 ppm or less.

Synthetic silica powder made by the sol-gel method usually includes 50 to 100 ppm of residual silanol. The amount of silanol of synthetic silica powder made by silicon tetrachloride as raw material can be controlled in a broad range of 0 to 1000 ppm, and usually includes chlorine in a concentration of approx. 100 ppm or more. When alkoxide is used as raw material, synthetic vitreous silica not including chlorine can be easily obtained. Synthetic silica powder made by the sol-gel method includes silanol in a concentration of 50 to 100 ppm before fusing as mentioned above. When the powder is vacuum-fused, silanol is removed and the amount of silanol in the obtained vitreous silica is reduced to approx. 5 to 30 ppm. The amount of silanol changes depending on fusing conditions such as fusing temperature, elevated temperature etc.

In general, synthetic vitreous silica (vitreous silica obtained by fusing synthetic silica powder) is said to have lower high-temperature viscosity than natural vitreous silica (vitreous silica obtained by fusing natural silica powder). One of the reasons for the lower high-temperature viscosity is that silanol or halogen destroys a mesh structure of $SiO_4$ tetrahedron. Synthetic vitreous silica has high light transmissibility for ultraviolet with a wavelength of approx. 200 nm or less. This synthetic vitreous silica has similar property to synthetic vitreous silica made of silicon tetrachloride as raw material and for ultraviolet optics. Unlike natural vitreous silica, when synthetic vitreous silica is excited by ultraviolet light with a wavelength of 245 nm, fluorescence peaks are not observed in the obtained fluorescence spectrum.

Natural silica powder means silica powder obtained by the processes of digging out naturally-existing quartz raw stones followed by crushing and purification etc. Natural silica powder is made of α-quartz crystal. Natural silica powder contains Al and Ti in a concentration of 1 ppm or more. Natural silica powder contains other metal impurities in a higher concentration than synthetic silica powder. Natural silica powder barely contains silanol. Natural vitreous silica obtained by fusing natural silica powder in the same conditions includes silanol in a concentration of less than 50 ppm.

When light transmissibility of natural vitreous silica is measured, light transmissibility rapidly decreases as the wavelength becomes shorter than 250 nm and light transmissibility is very small for light with a wavelength of 200 nm. This is mainly because of Ti contained in a concentration of about 1 ppm as impurities. An absorption peak is observed at around 245 nm. This peak is assigned to oxygen deficiency defects.

When natural vitreous silica is excited by ultraviolet light with a wavelength of 245 nm, fluorescence peaks at wavelengths of 280 nm and 390 nm are observed. These peaks are assigned to oxygen deficiency defects in the vitreous silica.

Whether vitreous silica is natural or synthetic may be determined by measuring either impurities concentrations, the amount of silanol, light transmissibility, or a fluorescence spectrum obtained by exciting the vitreous silica with ultraviolet light with a wavelength of 245 nm.

Silica powder may be quartz powder, or powder of a well-known raw material for a vitreous silica crucible such as quartz crystal, quartz sand etc.

In the electrode initial position setting process (S702) shown in FIGS. 1 and 2, the initial position of the carbon electrodes 13 is set by the electrode position setting unit 20 so that the carbon electrodes 13 form an inverse three-sided pyramid, each axis line 13L is directed to a direction so as to maintain an angle θ1, and the tips of the carbon electrodes 13 contact one another. In addition, an initial state of a mold-electrode relative position comprised of an electrode height position H which is a height dimension from the edge of the mold 10 to the electrode tips, or a position and an angle of an electrode position central axis (which is a central axis of an inverse three-sided pyramid formed by the carbon electrodes 13) and a rotation axis line of the mold 10 is also set.

In the arc fusing process (S703), the retained silica powder layer 11 is heated and fused by an arc discharge unit by adjusting positions of the electrodes 13 while depressurizing the silica powder layer 11 through ventilation passages 12, to form a vitreous silica layer.

The arc fusing process (S703) includes a process of starting the power supply (S801), a process of adjusting the electrode position (S802), a process of measuring the temperature in the mold (S803), a process of judging whether the local maximum point has been already observed (S808), a process of continuing heating (S809), a process of judging whether the temperature in the mold is within a predetermined range with reference to the reference temperature (S804), a process of controlling the temperature of the arc fused portion (S805), a process of judging whether the arc fusing terminating time has arrived (S806), and a process of terminating the power supply (S807). In the process of starting the power supply (S801), power is supplied to the carbon electrodes 13 in a predetermined amount from the power-supply unit (not shown). Arc discharge is not yet generated at this stage.

In the arc fusing process (S703), the interelectrode distances D are enlarged by changing the angles of the carbon electrodes 13 while maintaining the inverse three-sided pyramid with a downward tip by the electrode position setting unit 20. Then, arc discharge starts to be generated between the carbon electrodes 13. Supplied power to each of the carbon electrodes 13 is controlled to be a power density of, for example, 40 kVA/cm$^2$ to 1700 kVA/cm$^2$ by the power-supply unit.

The power may be supplied so as to adjust the power density at the carbon electrodes 13 to 40, 100, 500, 1000, 1500, or 1700 kVA/cm$^2$ or a value in the range between two values of the values exemplified here.

Furthermore, the mold-electrode relative position, such as the electrode height position H, is set to satisfy conditions to be a heat source necessary for fusing the silica powder layer 11 while maintaining the angles of θ1 by the electrode position setting unit 20.

The distance between the mold and the electrodes can be increased by moving the electrode position away from the mold by the electrode position setting unit 20, or by moving the mold position away from the electrodes by the controller. The distance between the mold and the electrodes can be decreased by moving the electrode position toward the mold by the electrode position setting unit 20, or by moving the mold position toward the electrodes by the controller.

Figure 8:
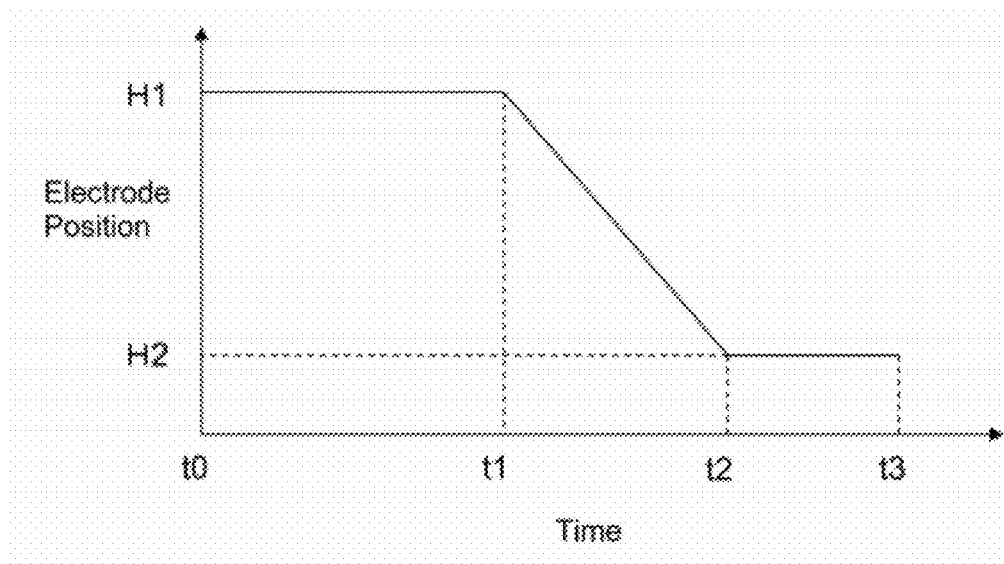
FIG. 8 is a graph showing a change of the height position of carbon electrodes in the embodiment of a method of manufacturing a vitreous silica crucible, according to the present invention.

In the arc fusing process (S703), the height position of the carbon electrodes 13 is varied as shown in FIG. 8. Specifically, the height position of the carbon electrodes 13 in the electrode initial position setting process (S702) is set to H1, and the power supply is started at time t0 (S801), and the height position is started to be lowered at time t1 (S802), the height is set to be H2 at time t2, and the power supply is terminated at time t3 (S807).

Figure 9:
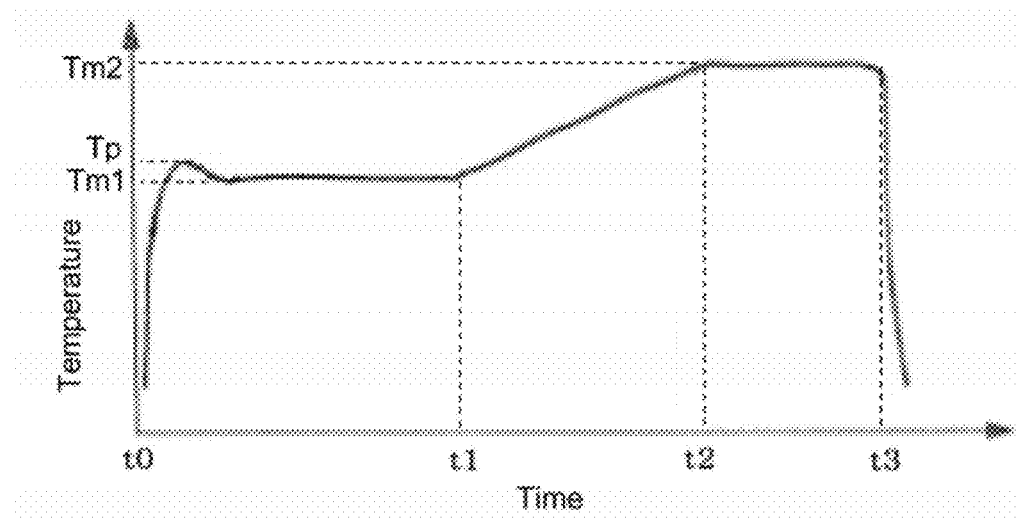
FIG. 9 is a graph showing a temperature change in the embodiment of a method of manufacturing a vitreous silica crucible, according to the present invention.

Furthermore, in the arc fusing process (S703), the temperature of the silica powder layer 11 in the mold is measured at the measuring points $P_1$ to $P_6$ by the radiation thermometer Cam from the start of the power supply (S801). As shown in FIG. 9, a local maximum point Tp of the temperature appears at any of the measuring points $P_1$ to $P_6$ at the beginning of the arc fusing process (S703). The temperature of the local maximum point Tp and the time in which it appears depends on the silica powder used. In FIG. 9, Tm1 and Tm2 are the temperatures at the positions H1 and H2, respectively, of the carbon electrodes 13.

In the present embodiment, the fusing conditions of the silica powder layer 11 are adjusted so that the local maximum point is detected at each of the measuring points $P_1$ to $P_6$ within the predetermined fusing time. The predetermined fusing time is set for each of the measuring points $P_1$ to $P_6$. Usually, the predetermined fusing time is 5 to 10 seconds for the measuring points $P_1$ to $P_5$, and approx. 60 seconds for the measuring point $P_6$. The local maximum point is detected usually first at the measuring point $P_3$, and last at the measuring point $P_6$. The fusing conditions include the amount of current supplied to the carbon electrodes 13, the position of the carbon electrodes 13, the relative position of the mold 10 and the carbon electrodes 13, and the position of the mold.

Here, the position of the carbon electrodes 13 refers to the opening angle of the carbon electrodes, and the horizontal or height position of the electrode tips, and the direction to which the arc flame generated by the electrodes is thrown.

Furthermore, the relative position of the mold 10 and the carbon electrodes 13 refers to the relative position of the direction of the mold rotation axis and the direction of the electrode center, and the relative position of the mold and the height position of the electrode tips, and the relative position of the mold and the horizontal position of the electrode tips.

Furthermore, the mold position refers to, for example, the direction of the mold rotation axis.

In adjusting the fusing conditions, when the local maximum point tends to appear earlier than the predetermined fusing time, the amount of current supplied to the carbon electrodes 13 is reduced or the carbon electrodes 13 are moved away from the silica powder layer 11 to decrease the temperature. In contrast, when the local maximum point tends to appear later than the predetermined fusing time, the amount of current supplied to the carbon electrodes 13 is increased or the carbon electrodes 13 are moved toward the silica powder layer 11 to increase the temperature.

In the process of terminating the power supply (S807), the power supply by the power-supply unit is terminated when the silica powder layer 11 is fused to be a predetermined state. By this arc fusing, the silica powder layer is fused to manufacture a vitreous silica crucible. In the arc fusing process (S703), the rotation of the mold 10 is controlled by a controller (not shown).

In the cooling process (S704), the vitreous silica crucible obtained in the arc fusing process is cooled. In the taking-out process (S705), the cooled vitreous silica crucible is taken out of the mold 10. In the finishing process (S706), a honing process of spraying high-pressure water onto the outer surface of the crucible, a rim-cutting process of adjusting the crucible height to a predetermined dimension, and a washing process of washing the inner surface of the crucible with hydrofluoric acid are carried out. A vitreous silica crucible can be obtained by the processes above.

In the present embodiment, the temperature in the mold is measured by the temperature measurement unit in the arc fusing process (S703) and the cooling process (S704). The temperature may be measured from the process of starting the power supply (S801) up to before the taking-out process (S705). The temperature may be measured in only a portion of these processes.

In the aforementioned method of manufacturing a vitreous silica crucible, the temperature of the inner surface of the silica powder layer 11 was measured at the measuring points $P_1$ to $P_6$ while rotating the mold, and the fusing conditions of the silica powder layer 11 are adjusted so that the local maximum point is detected at each measuring point within the predetermined fusing time which is set for each measuring point $P_1$ to $P_6$.

According to the method, it is possible to accurately detect the fused state of the silica powder layer by detecting the local maximum points at plural measuring points provided on different height positions, and thus it is possible to improve the inner surface property of the vitreous silica crucible by accurately controlling the arc discharge.

The bubble content rate of the transparent vitreous silica layer can be measured nondestructively by use of an optical detection unit. The optical detection unit includes a light-receiving apparatus which can receive the reflected light from the inner surface and the near-surface region of the measuring vitreous silica crucible. The light-emitting apparatus may be integrated into the optical detection unit, and an external light-emitting unit may be utilized.

Furthermore, the optical detection unit may be rotatable so that measurement along the inner surface of the vitreous silica crucible is enabled. As the irradiation light, any light such as visible light, ultraviolet and infrared light, and X-ray and a laser light may be used as long as bubbles can be detected by the reflection of the light. The light-receiving apparatus can be selected depending on the irradiation light, and is, for example, an optical camera having an optical lens and an image pickup unit. Bubbles existing in a certain depth from the surface can be detected by moving the focus of the optical lens from the surface to the depth.

The measurement result by the optical detection unit is inputted into an image processing device, and the bubble content rate is calculated based on the images. Specifically, the image of the crucible inner surface is taken by use of an optical camera, and the crucible inner surface is divided into unit areas 51. The area S2 occupied by bubbles is determined for each unit area 51, and the bubble content rate P (%) is calculated from P (%)=(S2/S1)*100. The measurement is carried out for the volume of 3 mm*3 mm*depth of 0.15 mm, and the detectable minimum bubble size is 50 μm.

In the present embodiment, the local maximum point of the temperature is detected in temperature measurement at the measuring points $P_3$, $P_4$ which are at the corner portion 11c. The wall thickness at the corner portion 11c tends to increase because fused silica comes from the wall portion 11d by the gravity and it comes from the bottom portion 11a by the centrifugal force of the mold 10. Therefore, the inner surface property of the crucible can be efficiently improved by the temperature measurement at the corner portion 11c. The inner surface property of the crucible can be more precisely controlled by measuring the temperature at the corner portion 11c, and setting the local maximum point of the temperature to be within a predetermined fusing time. The fusing conditions of the silica powder layer are adjusted so that the local maximum point is detected at each of the measuring points $P_1$ to $P_6$ within the predetermined fusing time. In this case, the fusing conditions of the silica powder layer can be adjusted very precisely, and thus the inner surface property of the vitreous silica crucible can be more improved.

In the present embodiment, the temperature of the silica powder layer 11 can be measured by detecting radiant energy of a wavelength of 4.8 to 5.2 μm by use of the radiation thermometer Cam. In this case, the temperature near the surface of the silica powder layer which is fused in a stringent environment over 2000 deg. C. can be measured precisely in real time. Thus, it is possible to precisely and easily detect the local maximum point of the temperature.

In the present embodiment, the radiation thermometer Cam and the measuring points $P_1$ to $P_6$ may be provided so that the line connecting the radiation thermometer Cam and each of the measuring points $P_1$ to $P_6$ is separated by 100 mm or more from the rotation axis of the mold. In this case, the temperature measurement is not largely affected by the carbon electrodes and the arc discharge, and the accuracy of the temperature measurement is improved.

In the present embodiment, the radiation thermometer Cam may change the measuring target among the plural measuring points $P_1$ to $P_6$ to follow the movement of the carbon electrodes. In this case, it is possible to detect the local maximum points at plural measuring points by use of a single radiation thermometer.

In the present embodiment, the number of the radiation thermometers Cam is plural, and the radiation thermometers measures temperatures at plural measuring points $P_1$ to $P_6$ provided on different heights. In this case, it is possible to detect the local maximum points at plural measuring points.

The present invention has been explained with reference to the embodiments. These embodiments are examples of the present invention, and thus the present invention is not limited to the embodiments, and other configurations may be employed. Furthermore, the configurations in the embodiments can be employed in combination. For example, the number and the position of electrodes and the method of power supply are not limited to the configurations shown above, and other configurations may be employed.

The number of the measuring points needs be 2 or more, but it does not have to be 6. Two or more temperature measurement units (radiation thermometers) may be provided to measure the temperatures of plural measuring points simultaneously. The arrangement of the measuring points is not limited, and thus can be set according to the purpose.

Alternatively, the fusing conditions are not adjusted even when the local maximum point is not detected. In this case, if the local maximum point of temperature is not detected within the predetermined fusing time, the manufacturing of the vitreous silica crucible is, for example, discontinued, and the vitreous silica crucible is excluded from the product.

EXAMPLE

Hereinafter, the present invention will be explained in more detail with reference to the examples. The present invention is not limited by these examples.

A vitreous silica crucible having a diameter of 610 mm (24 inches) was manufactured. In the manufacturing, the height position H of the electrode tips 13a was subjected to time-course change as shown in FIG. 8 by the electrode position setting unit 20 shown in FIG. 1. The height position was H1 from time t0 to t1, and the height position was H2 from time t2 to t3 (H1>H2).

While manufacturing, the temperatures at the measuring points $P_1$ to $P_6$ shown in FIG. 3 were measured during arc fusing by use of six radiation thermometers Cam. For example, at the measuring point $P_4$ in the corner portion 11c, the local maximum point shown in FIG. 9 was observed at the beginning of the arc fusing process. Such local maximum points were similarly observed at the measuring points $P_1$ to $P_3$ and $P_5$ to $P_6$ (not shown).

The temperature at the local maximum point at the measuring point $P_4$ was 2100 deg. C. in one sample, and 1700 deg. C. in another sample. For these samples, the fusing conditions of the silica powder layer 11 were adjusted so that the local maximum points is detected at each of the measuring points $P_1$ to $P_3$ and $P_5$ to $P_6$ within the predetermined fusing time (for the measuring points $P_1$ to $P_3$ and $P_5$, 5 to 10 seconds, and for the measuring point $P_6$, within 60 seconds).

The arc fusing was continued according to the following conditions for these samples to manufacture vitreous silica crucibles (these are referred to as Example 1 and Example 2, respectively). The reference temperature in the following conditions was the temperature at the local maximum point. The temperature control was carried out by the fine adjustment of the height position H and the supplied power. The temperature during the arc fusing was measured by detecting radiation energy of a wavelength of 4.8 to 5.2 μm by use of the radiation thermometer.

Example 1

Reference temperature: 2100 deg. C.
Temperature control conditions:
t0 to t1: the temperature ratio is 90 to 110% (approx. 1900 to 2300 deg. C.)
t2 to t3: the temperature ratio is 110 to 129% (approx. 2300 to 2700 deg. C.)

Example 2

Reference temperature: 1700 deg. C.
Temperature control conditions:
t0 to t1: the temperature ratio is 89 to 112% (approx. 1500 to 1900 deg. C.)
t2 to t3: the temperature ratio is 112 to 135% (approx. 1900 to 2300 deg. C.)

In the arc fusing process, the arc fusing portion and the measuring point were matched by controlling the electrode position or the mold height position.

Furthermore, vitreous silica crucibles having the reference temperature of 2100 deg. C. or 1700 deg. C. were manufactured in the same way as in Examples 1 and 2, but without temperature control (these are referred to as Comparative Example 1 and Comparative Example 2, respectively).

Table 1 shows whether or not the local maximum point was observed in the measuring points $P_1$ to $P_6$ during manufacturing the vitreous silica crucibles of Examples 1 to 2 and Comparative Examples 1 to 2. Furthermore, the wall thickness, the bubble content rate, and the uniformity of the bubble content rate were measured and evaluated for these crucibles, according to the criteria shown in Tables 2 to 4. The evaluation results are shown in Tables 5 to 6.

TABLE 1

|  | P1 | P2 | P3 | P4 | P5 | P6 |
| --- | --- | --- | --- | --- | --- | --- |
| Ex. 1 | A | A | A | A | A | A |
| Ex. 2 | A | A | A | A | A | A |
| Comp. Ex. 1 | A | A | A | A | N | N |
| Comp. Ex. 2 | N | N | A | A | A | A |

A = local maximum point appears
N = local maximum point does not appear

TABLE 2

| Wall Thickness | Bottom Portion (mm) | Corner Portion (mm) | Wall Portion (mm) |
| --- | --- | --- | --- |
| Excellent | 8.0 to 9.0 | 20.0 to 22.0 | 10.0 to 11.0 |
| Good | 7.0 to 10.0 Except 8.0 to 9.0 | 19.0 to 23.0 Except 20.0 to 22.0 | 9.0 to 12.0 Except 10.0 to 11.0 |
| Poor | Less Than 7.0 or More Than 10.0 | Less Than 19.0 or More Than 23.0 | Less Than 9.0 or More Than 12.0 |

TABLE 3

| Bubble Content Rate | Bottom Portion (%) | Corner Portion (%) | Wall Portion (%) |
| --- | --- | --- | --- |
| Excellent | <0.10 | <0.20 | <0.50 |
| Good | 0.10 to 0.20 | 0.20 to 0.50 | 0.50 to 0.90 |
| Poor | >0.20 | >0.50 | >0.90 |

TABLE 4

| Uniformity of Bubble Content Rate | Standard Deviation of Bubble Content Rate in Circumferential Direction |
| --- | --- |
| Excellent | +/−σ |
| Good | +/−2σ |
| Poor | +/−3σ |

TABLE 5

| Wall Thickness | Bottom Portion | | Corner Portion | | Wall Portion | |
| --- | --- | --- | --- | --- | --- | --- |
|  | (mm) | Evaluation | (mm) | Evaluation | (mm) | Evaluation |
| Ex. 1 | 9.0 | Excellent | 21.5 | Excellent | 10.1 | Excellent |
| Ex. 2 | 8.9 | Excellent | 21.8 | Excellent | 9.9 | Good |
| Comp. Ex. 1 | 7.4 | Good | 23.4 | Poor | 8.6 | Poor |
| Comp. Ex. 2 | 7.8 | Poor | 23.8 | Poor | 9.7 | Good |

TABLE 6

|  | Bubble Content Rate | | | Uniformity of Bubble Content Rate |
| --- | --- | --- | --- | --- |
|  | Bottom Portion | Corner Portion | Wall Portion |  |
| Ex. 1 | Excellent | Good | Excellent | Excellent |
| Ex. 2 | Good | Excellent | Excellent | Good |
| Comp. Ex. 1 | Poor | Poor | Good | Poor |
| Comp. Ex. 2 | Poor | Poor | Poor | Poor |

The results shown above indicates that, in Examples 1 and 2 where the fusing conditions of the silica powder layer were adjusted so that the local maximum point was detected at any of the measuring points $P_1$ to $P_6$ within the predetermined fusing time (for the measuring points $P_1$ to $P_5$, 5 to 10 seconds, and for the measuring point $P_6$, within 60 seconds), a vitreous silica crucible having a desired wall thickness, bubble content rate, and uniformity of the bubble content rate was manufactured. That is, a vitreous silica crucible suitable for pulling a single crystal was manufactured by adjusting the fusing conditions so that the local maximum point was detected during the predetermined fusing time.

The local maximum point was first discovered in the present Example, and the method of controlling the temperature with reference to the reference temperature which is the temperature of the local maximum point is completely different from a conventional controlling method. The reason why the local maximum point is observed is not clearly known, but is considered to be related to the change from silica powder to vitreous silica.

Furthermore, the temperature was measured while the mold was rotating. Therefore, the temperature measurement on one point was the temperature measurement on the circumference including the one point. Furthermore, in the present Example, the arc fusing portion and the measuring point were matched, and thus it was possible to precisely detect the temperature change which happened when the arc fusing conditions were adjusted.

In sum, the present invention has been explained with reference to Examples. It should be understood to those skilled in the art that the Examples are just examples, and various modifications are possible, and those modifications are within the scope of the present invention.

| | EXPLANATION OF REFERENCE SYMBOL |
| --- | --- |
| 1 | Silica Vitreous Silica Crucible Manufacturing Apparatus |
| 10 | Mold |
| 11 | Silica Powder Layer |
| 12 | Ventilation Passage |
| 13 | Carbon Electrode |
| 13a | Electrode Tip |
| 13L | Axis Line |
| 20 | Electrode Position Setting Unit |
| 21 | Supporting Unit |
| 22 | Angle Setting Axis |
| Cam | Radiation Thermometer |
| SS | Partition Wall |
| F1 | Filter |

What is claimed is:

1. A method of manufacturing a vitreous silica crucible comprising:

a silica powder supplying process of supplying a material silica powder into a mold for molding a vitreous silica crucible, to form a silica powder layer, and an arc fusing process of arc fusing the silica powder layer by arc discharge generated by carbon electrodes, wherein the arc fusing process includes processes of measuring temperatures at measuring points provided on different heights of an inner surface of the silica powder layer while rotating the mold, and controlling the arc discharge to enable detection, at each measuring point, of a local maximum point which appears first in the arc fusing process, the temperature of the silica powder layer is measured by a radiation thermometer, the radiation thermometer and the measuring point are provided so that a line connecting the radiation thermometer and the measuring point is separated by 100 mm or more from a rotation axis of the mold, and the radiation thermometer changes a measuring target among the measuring points to follow the movement of the carbon electrodes.

2. The method of claim 1, wherein fusing conditions of the silica powder layer are adjusted to enable detection, at each measuring point, of the local maximum point within a predetermined fusing time.

3. The method of claim 1, wherein the radiation thermometer measures the temperature of the silica powder layer by detecting radiation energy of a wavelength of 4.8 to 5.2 µm.

4. The method of claim 3, wherein the number of the radiation thermometers is plural, and the radiation thermometers measure temperatures at plural measuring points provided on different heights.

* * * * *